United States Patent
Wong et al.

(10) Patent No.: US 12,364,383 B2
(45) Date of Patent: Jul. 22, 2025

(54) REMOTE CONTROL DISH WASHING MACHINE

(71) Applicant: Continental Clean Tech Limited, Hong Kong (CN)

(72) Inventors: Kwok Din Wong, Hong Kong (CN); Kam Por Chan, Hong Kong (CN)

(73) Assignee: Continental Clean Tech Limited, Hong Kong (CN)

( * ) Notice: Subject to any disclaimer, the term of this patent is extended or adjusted under 35 U.S.C. 154(b) by 117 days.

(21) Appl. No.: 18/537,200

(22) Filed: Dec. 12, 2023

(65) Prior Publication Data

US 2024/0108190 A1      Apr. 4, 2024

Related U.S. Application Data

(62) Division of application No. 17/167,592, filed on Feb. 4, 2021, now Pat. No. 11,857,131.

(51) Int. Cl.
    *A47L 15/00* (2006.01)
    *A47L 15/42* (2006.01)
    *H04M 1/72415* (2021.01)

(52) U.S. Cl.
    CPC ....... *A47L 15/0063* (2013.01); *A47L 15/0049* (2013.01); *A47L 15/0055* (2013.01); *A47L 15/428* (2013.01); *H04M 1/72415* (2021.01)

(58) Field of Classification Search
    None
    See application file for complete search history.

(56) References Cited

U.S. PATENT DOCUMENTS

| | | | |
|---|---|---|---|
| 9,951,451 B2 | 4/2018 | Park et al. | |
| 10,149,594 B2 | 12/2018 | Jung et al. | |
| 2012/0118336 A1 | 5/2012 | Welch | |
| 2018/0256001 A1 | 9/2018 | Wong et al. | |
| 2019/0307307 A1 | 10/2019 | Wong et al. | |

OTHER PUBLICATIONS

U.S. Appl. No. 63/010,193, filed Apr. 15, 2020.
Wikipedia, SMS, https://en.wikipedia.org/wiki/SMS, 2023 (17 pages).
Wikipedia, Sim Card, https://en.wikipedia.org/wiki/SIM_card, 2023 (17 pages).

*Primary Examiner* — Rita P Adhlakha
(74) *Attorney, Agent, or Firm* — FLYNN THIEL, P.C.

(57) ABSTRACT

A dish washing machine communication system including a dish washing machine having a dish washing machine SMS messaging system and a remote communicator with a remote communicator SMS messaging system, with the remote communicator being physically separate from the dish washing machine. The remote communicator SMS messaging system of the remote communicator sends instructions and/or requests for information to the dish washing machine SMS messaging system of the dish washing machine in text format. The dish washing machine SMS messaging system of the dish washing machine also sends information to the remote communicator SMS messaging system of the remote communicator in text format.

19 Claims, 2 Drawing Sheets

REMOTE CONTROL DISH WASHING MACHINE

CROSS-REFERENCE TO RELATED APPLICATION

This is a divisional of U.S. Ser. No. 17/167,592, filed Feb. 4, 2021, the disclosure of which is hereby incorporated by reference in its entirety.

FIELD OF THE INVENTION

The present invention relates to dish washing machines, and in particular to a system for remotely controlling a dish washing machine.

BACKGROUND OF THE INVENTION

Commercial establishments for cooking and/or preparing food typically have a commercial dish washer for washing dirty dishes. The dish washers spray a detergent and water onto the dirty dishes to clean the dishes. The dish washers can also spray a rinse aid and water onto the dishes after the dishes have been washed to rinse the dishes and prevent spots on the dishes.

SUMMARY OF THE INVENTION

The present invention, according to one aspect, is directed to a method of communication between a dish washing machine including a housing having a wash space therein and a remote communicator. The method comprises providing the dish washing machine with a dish washing machine SMS messaging system, providing the remote communicator with a remote communicator SMS messaging system, typing instructions as first text into the remote communicator, sending the first text as a SMS message from the remote communicator SMS messaging system of the remote communicator to the dish washing machine SMS messaging system of the dish washing machine, and altering elements of the dish washing machine in response to the first text.

Yet another aspect of the present invention is to provide a method of communication between a dish washing machine including a housing having a wash space therein and a remote communicator. The method comprises providing the dish washing machine with a dish washing machine SMS messaging system, providing the remote communicator with a remote communicator SMS messaging system, typing a request for information as first text into the remote communicator, sending the first text as a SMS message from the remote communicator SMS messaging system of the remote communicator to the dish washing machine SMS messaging system of the dish washing machine, and sending second text as a SMS message from the dish washing machine SMS messaging system of the dish washing machine to remote communicator SMS messaging system of the remote communicator in response to the first text.

Another aspect of the present invention is to provide a method of communication between a dish washing machine including a housing having a wash space therein and a remote communicator. The method comprises providing the dish washing machine with a dish washing machine SMS messaging system, providing the remote communicator with a remote communicator SMS messaging system, preparing first text in the dish washing machine in response to readings taken by the dish washing machine, and automatically sending the first text as a SMS message from the dish washing machine SMS messaging system of the dish washing machine to remote communicator SMS messaging system of the remote communicator.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Certain terminology will be used in the following description for convenience in reference only, and will not be limiting. Said terminology will include the words specifically mentioned, derivatives thereof, and words of similar import.

DETAILED DESCRIPTION

Figure 1:
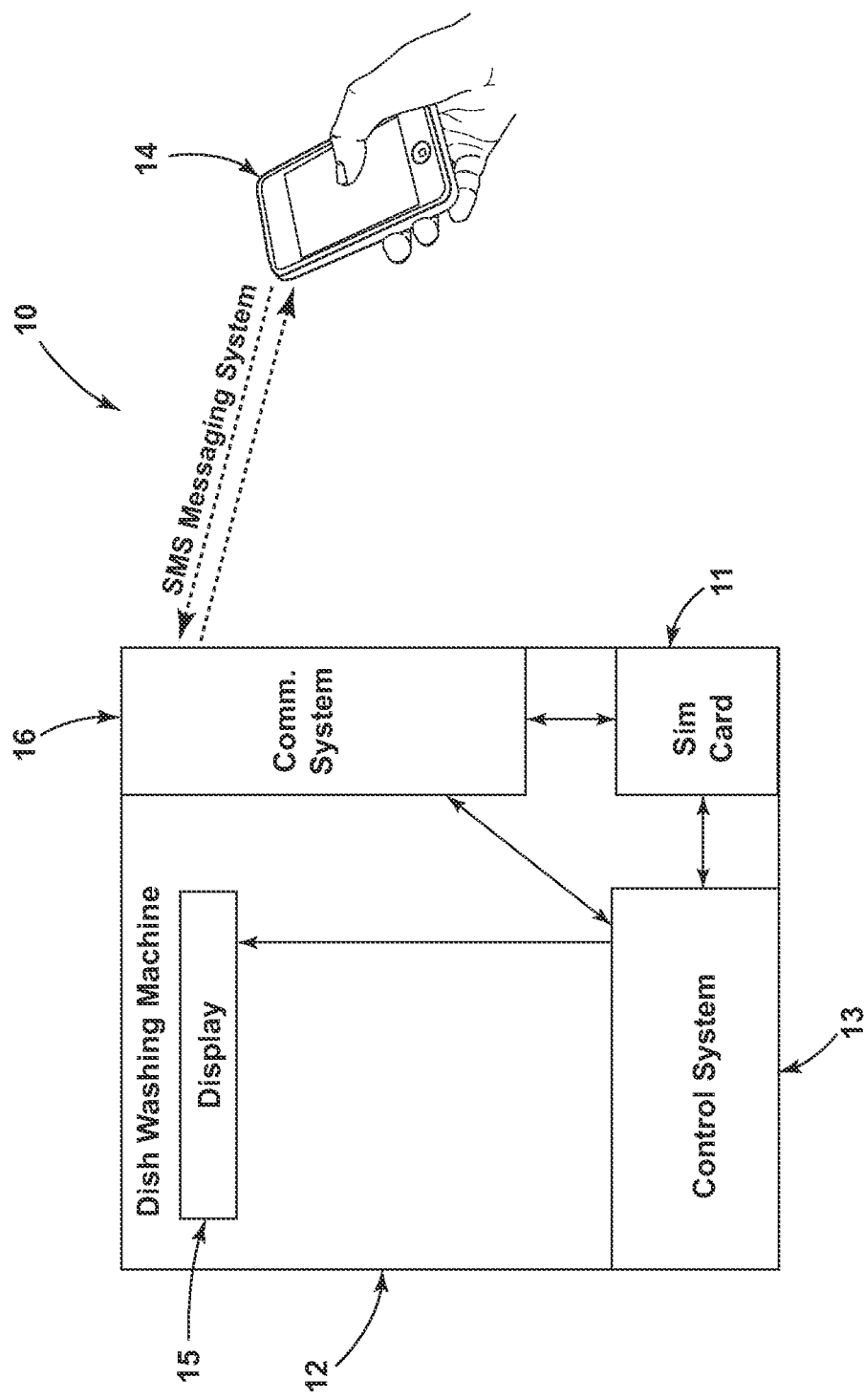
FIG. 1 is a schematic view of a dish washing machine communication system according to the invention.

FIG. 1 illustrates a schematic of a dish washing machine communication system 10 according to an aspect the present invention. The dish washing machine communication system 10 includes a dish washing machine 12 and communication device 14. The dish washing machine 12 includes an integral communication system 16 for communication with the communication device 14. The integral communication system 16 of the dish washing machine 12 and the communication device 14 are able to communicate text messages with each other employing SMS (short message service) over telephone, Internet and/or mobile device systems. For example, the communication device 14 can be a mobile or cell phone and the integral communication system 16 can include mobile or cell phone technology. The dish washing machine 12 includes a SIM card 11 that is in communication with the integral communication system 16 and a control system 13 of the dish washing machine 12. The control system 13 also communicates information to the integral communication system 16 and provides instructions to display information on a display 15 of the dish washing machine 12.

In the illustrated example, the dish washing machine 12 can comprise any dish washing machine including typical components as well known to those skilled in the art. For example, the dish washing machine 12 could be the machine as set forth in U.S. Patent Application Publication No. 2018/0256001 entitled DISH WASHING MACHINE, the machine set forth in U.S. Patent Application Publication No. 2019/0307307 entitled DISH WASHING MACHINE WITH HEAT EXCHANGERS, or the machine as set forth in U.S. Patent Application Ser. No. 63/010 193 entitled DISH WASHING MACHINE WITH HEAT EXCHANGERS, the entire contents of all of which are hereby incorporated herein by reference.

Figure 2:
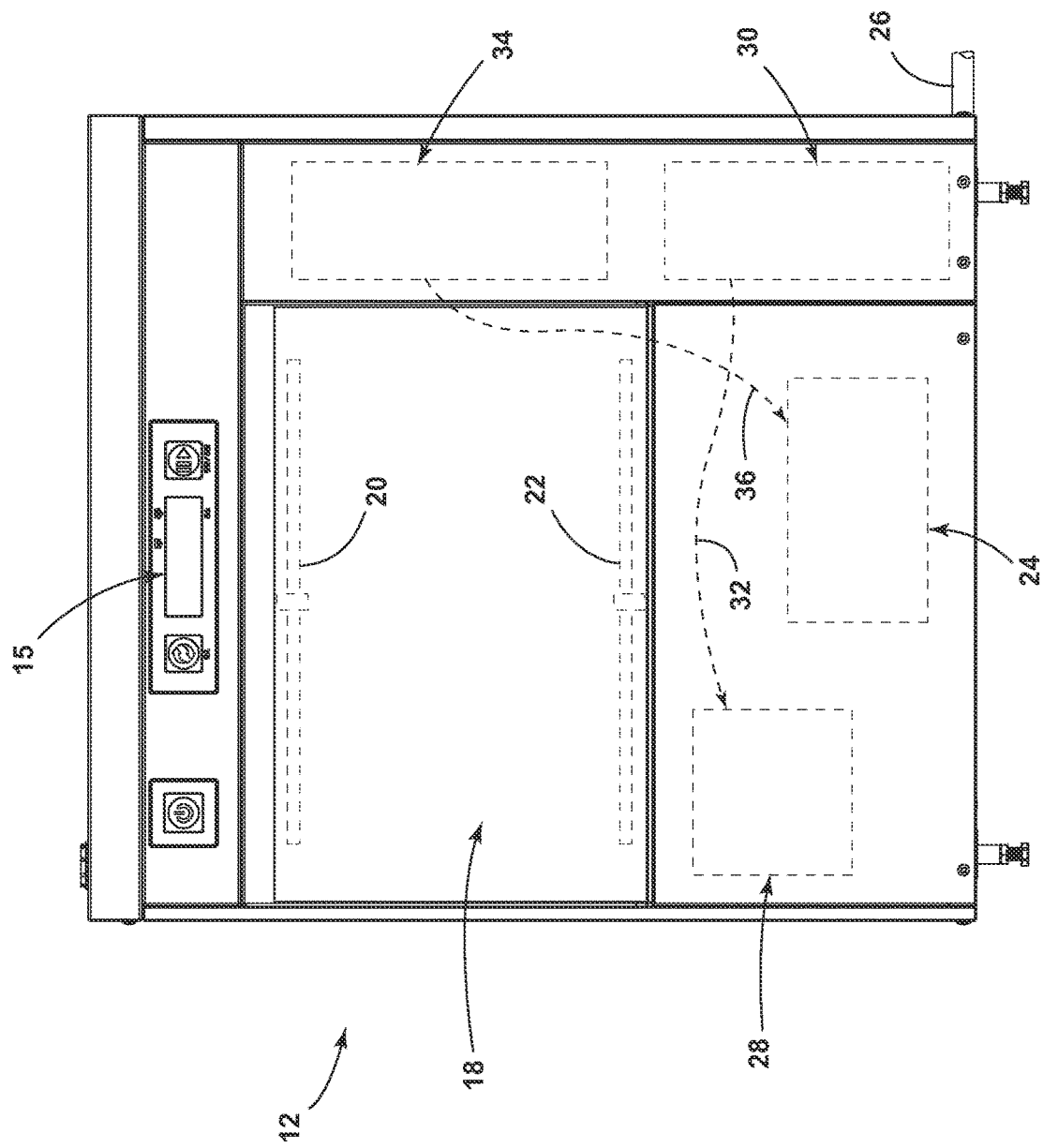
FIG. 2 is a front view of a dish washing machine of the dish washing machine communication system according to the invention.

FIG. 2 represents an embodiment of the dish washing machine 12 that can be used in the dish washing machine communication system 10. The dish washing machine 12 of FIG. 2 can be the dish washing machine as disclosed in U.S. Patent Application Publication No. 2018/0256001 entitled DISH WASHING MACHINE and can function as such dish washing machine functions. The dish washing machine 12 can include an internal wash space compartment 18 for receiving dishes to be washed and 15 display. Upper rotating wash arms 20 and lower rotating wash arms 22 spray fluid onto the dishes within the internal wash space compartment 18 to clear and rinse the dishes. A booster heating tank 24 can accept water from a water supply 26 to heat the water before use.

As is well known to those skilled in the art, during a wash cycle, the heater water from the booster heating tank 24 is sprayed through the upper rotating wash arms 20 and lower rotating wash arms 22 to fall into a wash tank 28. Wash detergent from a wash detergent tank 30 is supplied to the wash tank 28 via a wash detergent line 32. The water in the wash tank 28 with the wash detergent is then cycled over the dishes a certain number of times to wash the dishes (wash tank 28 to spray arms 20,22 to the wash tank 28 to the spray arms 20, 22 etc.).

After the wash cycle is complete, the wash tank 28 is emptied. A rinse aid from a rinse aid tank 34 is then supplied to the booster heating tank 24 via a rinse aid line 36. As is well known to those skilled in the art, during a rinse cycle, the heater water from the booster heating tank 24 is sprayed through the upper rotating wash arms 20 and lower rotating wash arms 22 to fall into the wash tank 28. The water in the wash tank 28 with the rinse aid is then cycled over the dishes a certain number of times to rinse the dishes (wash tank 28 to spray arms 20, 22 to the wash tank 28 to the spray arms 20, 22 etc.). While are particular dish washing machine 12 is shown, as outlined above, any dish washing machine could be employed.

The illustrated dish washing machine communication system 10 allows the user of the communication device 14 to send text instructions employing SMS to the dish washing machine 12 to have the dish washing machine 12 perform certain functions. The text instructions employing SMS can be sent from the communication device 14 to have the dish washing machine 12 perform certain functions includes taking active steps. For example, as illustrated in FIG. 1, text instructions employing SMS can instruct the SIM card 11 to disable and lock such that the control system 13 of the dish washing machine 12 is not able to function (e.g., texting "STOP" from the communication device 14 to the integral communication system 16). Likewise, text instructions employing SMS can instruct the SIM card 11 to enable such that the control system 13 of the dish washing machine 12 is able to function (e.g., texting "START"). The text instructions employing SMS can instruct the control system 13 of the dish washing machine 12 to perform certain actions or preset functions. For example, the text instructions employing SMS can instruct the control system 13 of the dish washing machine 12 to heat up and/or maintain the water in the dish washing machine 12 at a set temperature (e.g., texting "A TEMP") using the booster heating tank 24 and/or the wash tank 28, instruct the control system 13 of the dish washing machine 12 to stop heating the water in the dish washing machine 12 (e.g., texting "SHUT A TEMP"), or instruct the control system 13 of the dish washing machine 12 to empty all water from the wash tank 28 (e.g., texting "EMPTY TANK"). It is also contemplated that the text instructions employing SMS can instruct the control system 13 of the dish washing machine 12 to display messages on the display 15. For example, the text instructions employing SMS can instruct the control system 13 of the dish washing machine 12 to display a NOTE from a remote communicator to a dish washing machine user (e.g., texting "NOTE" to have the display 15 display information that is pertinent to dish washing machine user.) It is contemplated that other messages can be sent via text instructions employing SMS to the dish washing machine 12 from the communication device 14 to force the dish washing machine 12 and the control system 13 thereof to perform other functions (e.g., beginning a wash cycle).

In the illustrated example, the illustrated dish washing machine communication system 10 allows the user of the communication device 14 to send text instructions employing SMS to the dish washing machine 12 to have the dish washing machine 12 send information about the dish washing machine 12 to the communication device 14 via text messages employing SMS. For example, text instructions employing SMS can instruct the control system 13 to determine how much wash detergent is in the wash detergent tank 30 and to send a message back to the communication device 14 with the amount of wash detergent in the wash detergent tank 30 (e.g., by texting "DETER" from the communication device 14 to the internal communication system 16 and receiving an answer back via text message employing SMS stating the amount in a liquid measurement (e.g., liters)). Another example is texting instructions employing SMS to instruct the control system 13 to determine how much rinse aid is in the rinse aid tank 34 and to send a message back to the communication device 14 with the amount of rinse aid in the rinse aid tank 34 (e.g., by texting "RINSE" from the communication device 14 to the internal communication system 16 and receiving an answer back via text message employing SMS stating the amount in a liquid measurement (e.g., liters)). A further example is texting instructions employing SMS to instruct the control system 13 to determine how many wash cycles have been carried out and to send a message back to the communication device 14 with the number of cycles (e.g., by texting "CYCLE" from the communication device 14 to the internal communication system 16 and receiving an answer back via text message employing SMS stating the number of cycles) or to determine how many hours the dish washing machine 12 has run and to send a message back to the communication device 14 with the amount of time running (e.g., by texting "HOURS" from the communication device 14 to the internal communication system 16 and receiving an answer back via text message employing SMS stating the number of hours). It is contemplated that the user of the dish washing machine communication system 10 can ask for and receive any information about the dish washing machine 12 by sending text messages employing SMS from the communication device 14 to the dish washing machine 12.

The illustrated dish washing machine communication system 10 also provides for the dish washing machine 12 to send communications via text message employing SMS to the communication device 14 via the communication system 16 of the dish washing machine 12. The communications sent to the communication device 14 can be directly in response to requests for information sent to the dish washing machine 12 as outlined above or can be information. The dish washing machine communication system 10 can be set up to provide any response from the dish washing machine 12 to any particular request made by the communication device 14. For example, the following non-exhaustive list includes responses via text message employing SMS that can be sent from the dish washing machine 12 to the communication device 14 via the communication system 16 of the dish washing machine 12:

| Message from Communication Device | Response Message from Dish Washing Machine |
|---|---|
| HOURS | TTL HR MACHINE: [X]H (with X being the number of hours) |
| DETER | DET LEFT: [X]L (with X being the number of liters) |
| RINSE | RINS AID LEFT: [X]L (with X being the number of liters) |
| NOTE | [Pre-programmed message displayed at machine] |
| STOP | STOPPED |
| START | RE STARTED MACHINE |
| CYCLE | CLEANING CYCLES: [X] (with X being the number of cycles) |
| A TEMP | A TEMP OK |
| EMPTYTANK | TANK EMPIED |
| SHUTATEMP | SHUT A TEMP OK |

As shown above, the responses can be responses to questions or confirmation that instructions have been carried out. The above list of responses and confirmations to instructions sent via text message employing SMS to the communication device 14 via the communication system 16 of the dish washing machine 12 is presented only as examples and the list of responses can be any responses.

In the illustrated example, the communications sent to the communication device 14 via text message employing SMS can also be information or automatic alerts generated by the dish washing machine 12 and sent without prompting by the communication device 14. The information or automatic alerts can be regarding any system of the dish washing machine 12 and can include error messages and alerts as to levels of elements (e.g., detergent and rinse aid) in the dish washing machine. Such information or automatic alerts can be determined from any combination of sensors (e.g., thermal, pressure, position, level, etc.) communicating with the control system 13 of the dish washing machine 12 and/or programs in the control system 13 of the dish washing machine 12. For example, the following non-exhaustive list includes information or automatic alerts that can be sent via text message employing SMS from the dish washing machine 12 to the communication device 14 via the communication system 16 of the dish washing machine 12:

| Text Message: | Meaning: |
|---|---|
| Er-01-CHK WATER SUPPLY | ERROR CODE 01: User needs to check the water supply to the dish washing machine |
| Er-02-BSTER NO HEATG | ERROR CODE 02: User needs to check the booster tank heater at the dish washing machine |
| Er-03-WASH NO HEATG | ERROR CODE 03: User needs to check the wash tank heater at the dish washing machine |
| Er-04-WASH TEMP TOO HI | ERROR CODE 04: User needs to check the wash tank temperature, too high at the dish washing machine |
| Er-05-BSTER TEMP TOO HI | ERROR CODE 05: User needs to check the booster tank temperature, too high at the dish washing machine |
| Er-06-WASH H2O TOO LO | ERROR CODE 06: User needs to check the wash tank water level, too low at the dish washing machine |
| Er-08-WASH H2O TOO HI | ERROR CODE 08: User needs to check the wash tank water level, too high at the dish washing machine |
| Er-09-WASH H2O BELOW HEATER | ERROR CODE 09: User needs to check the wash tank water level, too low below heater at the dish washing machine |
| Er-10-BSTER H2O TOO HI | ERROR CODE 10: User needs to check the booster tank water level, too high at the dish washing machine |
| Er-11-BSTER H2O BELOW HEATER | ERROR CODE 11: User needs to check the booster tank water level, too low below heater at the dish washing machine |
| Er-12-BSTER TEMP TOO HI OR SENSOR OPEN | ERROR CODE 12: User needs to check the booster tank temperature, too high or sensor is an open circuit at the dish washing machine |
| Er-13-BSTER TEMP TOO HI OR SENSOR SHORT | ERROR CODE 13: User needs to check the booster tank temperature, too high or sensor is a short circuit at the dish washing machine |
| Er-14-WASH TEMP TOO HI OR SENSOR OPEN | ERROR CODE 14: User needs to check the wash tank temperature, too high or sensor is an open circuit at the dish washing machine |
| Er-15-WASH TEMP TOO HI OR SENSOR SHORT | ERROR CODE 15: User needs to check the wash tank temperature, too high or sensor is a short circuit at the dish washing machine |
| NO DET 5L | Dish washing machine has only 5 liters of detergent left |
| NO RINS AID 2L | Dish washing machine has only 2 liters of rinse aid left |
| NO DET 2L | Dish washing machine has only 2 liters of detergent left |
| NO RINS AID 08 | Dish washing machine has only 0.8 liters of rinse aid left |

As shown above, the information or automatic alerts can be related to any subject matter. The above list of information or automatic alerts sent via text message employing SMS to the communication device 14 via the communication system 16 of the dish washing machine 12 is presented only as examples and the list of information or automatic alerts can be any information or automatic alerts.

In an embodiment of the present invention, the dish washing machine 12 and the remote communicator 14 can communicate with each other employing via text message employing SMS. The SMS messaging system of the remote communicator 14 can send instructions and/or requests for information to the communication system 16 of the dish washing machine in text format and the dish washing machine 12 can send information in response to the requests for information or automatic alerts to the remote communicator 14 in text format.

Although particular preferred embodiments of the invention have been disclosed in detail for illustrative purposes, it will be recognized that variations or modifications of the disclosed apparatus, including the rearrangement of parts, lie within the scope of the present invention. For example, it is contemplated that only a single rotating spray arm (upper or lower) could be used.

What is claimed is:

1. A method of communication between a dish washing machine including a housing having a wash space therein and a remote communicator, the method comprising:
providing the dish washing machine with a dish washing machine SMS messaging system;
providing the remote communicator with a remote communicator SMS messaging system;
typing instructions as first text into the remote communicator;
sending the first text as a SMS message from the remote communicator SMS messaging system of the remote communicator to the dish washing machine SMS messaging system of the dish washing machine; and
altering elements of the dish washing machine in response to the first text.

2. The method of claim 1, further including:
typing a request for information as second text into the remote communicator;
sending the second text as a SMS message from the remote communicator SMS messaging system of the remote communicator to the dish washing machine SMS messaging system of the dish washing machine; and
sending third text as a SMS message from the dish washing machine SMS messaging system of the dish washing machine to the remote communicator SMS messaging system of the remote communicator in response to the second text.

3. The method of claim 2, further including:
preparing fourth text in the dish washing machine in response to readings taken by the dish washing machine; and
automatically sending the fourth text as a SMS message from the dish washing machine SMS messaging system of the dish washing machine to the remote communicator SMS messaging system of the remote communicator.

4. The method of claim 1, further including:
preparing second text in the dish washing machine in response to readings taken by the dish washing machine; and
automatically sending the second text as a SMS message from the dish washing machine SMS messaging system of the dish washing machine to the remote communicator SMS messaging system of the remote communicator.

5. The method of claim 1, further including:
providing the dish washing machine with a SIM card.

6. The method of claim 1, wherein:
the instructions include instructions to enable or disable the dish washing machine;
further including enabling the dish washing machine in response to the instructions to enable the dish washing machine and disabling the dish washing machine in response to the instructions to disable the dish washing machine.

7. A method of communication between a dish washing machine including a housing having a wash space therein and a remote communicator, the method comprising:
providing the dish washing machine with a dish washing machine SMS messaging system;
providing the remote communicator with a remote communicator SMS messaging system;
typing a request for information as first text into the remote communicator;
sending the first text as a SMS message from the remote communicator SMS messaging system of the remote communicator to the dish washing machine SMS messaging system of the dish washing machine; and
sending second text as a SMS message from the dish washing machine SMS messaging system of the dish washing machine to the remote communicator SMS messaging system of the remote communicator in response to the first text.

8. The method of claim 7, further including:
preparing third text in the dish washing machine in response to readings taken by the dish washing machine; and
automatically sending the third text as a SMS message from the dish washing machine SMS messaging system of the dish washing machine to the remote communicator SMS messaging system of the remote communicator.

9. The method of claim 7, further including:
providing the dish washing machine with a SIM card.

10. The method of claim 7, wherein:
the dish washing machine includes a wash tank; and
the requests for information and the information relate to the wash tank.

11. The method of claim 10, wherein:
the dish washing machine further includes a booster heating tank; and
the requests for information and the information further relate to the booster heating tank.

12. The method of claim 7, wherein:
the dish washing machine further includes a booster heating tank; and
the requests for information and the information further relate to the booster heating tank.

13. The method of claim 7, wherein:
the dish washing machine further includes a detergent tank holding a detergent; and
the requests for information and the information further relate to a level of the detergent in the detergent tank.

14. The method of claim 7, wherein:
the dish washing machine further includes a rinse aid tank holding a rinse aid; and
the requests for information and the information further relate to a level of the rinse aid in the rinse aid tank.

15. A method of communication between a dish washing machine including a housing having a wash space therein and a remote communicator, the method comprising:
providing the dish washing machine with a dish washing machine SMS messaging system;
providing the remote communicator with a remote communicator SMS messaging system;
preparing first text in the dish washing machine in response to readings taken by the dish washing machine; and
automatically sending the first text as a SMS message from the dish washing machine SMS messaging system of the dish washing machine to the remote communicator SMS messaging system of the remote communicator.

16. The method of claim 15, wherein:
the dish washing machine further includes a detergent tank holding a detergent; and
the automatic alerts relate to a detergent aid level of the detergent in the detergent tank.

17. The method of claim 16, wherein:
the dish washing machine further includes a rinse aid tank holding a rinse aid; and the automatic alerts relate to a rinse aid level of the rinse aid in the rinse aid tank.

18. The method of claim 15, wherein:

the automatic alerts relate to errors of the dish washing machine.

19. The method of claim 15, further including:

providing the dish washing machine with a SIM card.

\* \* \* \* \*